J. A. McMANUS.
WAVE MOTOR.
APPLICATION FILED DEC. 28, 1906.

901,117.

Patented Oct. 13, 1908.

WITNESSES:
Francis A Pocock
J.␣Williamson

INVENTOR
John A. McManus
BY
W. Preston Williamson
ATTORNEY

UNITED STATES PATENT OFFICE.

JOHN A. McMANUS, OF PHILADELPHIA, PENNSYLVANIA.

WAVE-MOTOR.

No. 901,117.

Specification of Letters Patent.

Patented Oct. 13, 1908.

Application filed December 28, 1906. Serial No. 349,768.

*To all whom it may concern:*

Be it known that I, JOHN A. McMANUS, a citizen of the United States, residing at Philadelphia, county of Philadelphia, and State of Pennsylvania, have invented a certain new and useful Improvement in Wave-Motors, of which the following is a specification.

My invention relates to a new and useful improvement in wave motors, and has for its object to provide an exceedingly simple and effective arrangement by which water or other fluid may be constantly pumped by the action of the waves and then forced through a turbine or other suitable motor, to which is coupled an electric generator whereby a constant electric current may be produced and conveyed to any suitable point.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1:
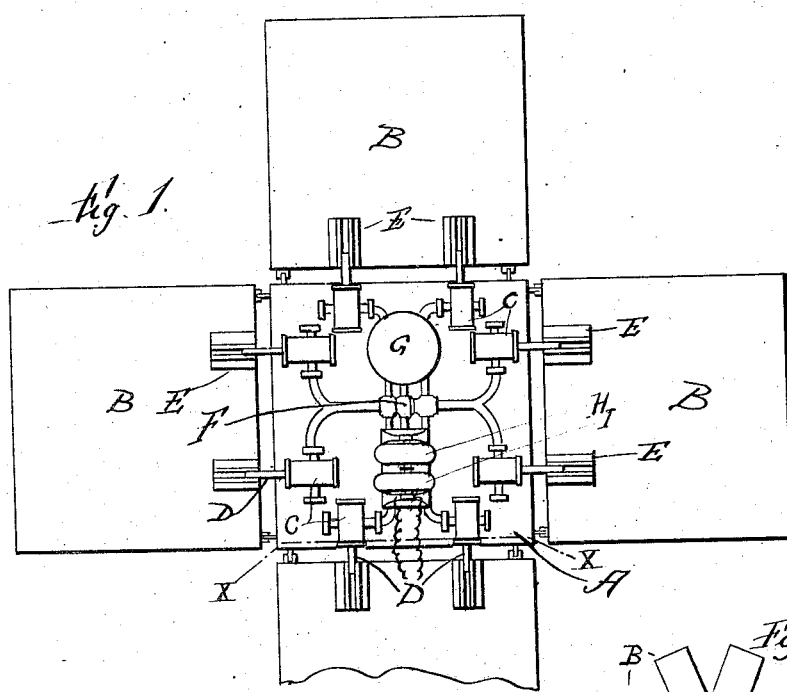
Figure 3:
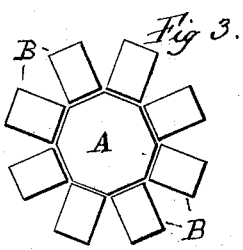
Figure 2:
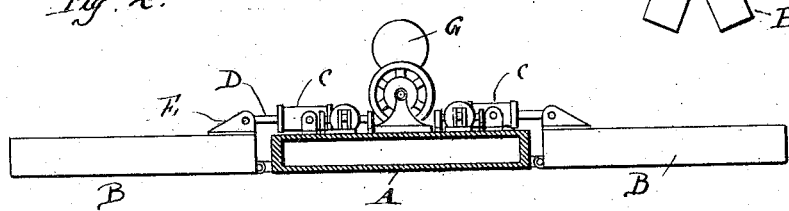

Figure 1 is a plan view of my improved wave motor showing the operating mechanism thereon. Fig. 2, an elevation, the end of the central float being sectioned away at the line x—x of Fig. 1 to show that the interior of said float is hollow. Fig. 3, a diagrammatical view illustrating the use of a considerable number of secondary floats in connection with the main or central float.

In carrying out my invention as here embodied, I provide a central float A, to which are hinged the secondary floats B, in such manner that the movement of the waves will cause the secondary floats to swing upon their hinges, and upon the main or central float I locate a number of pump cylinders C, which are preferably pivoted so as to have a rocking movement thereon, the piston rod D of said cylinders being pivoted to the blocks E, secured upon the secondary floats. By this arrangement any movement of the secondary floats relative to the central float will actuate the pumps C to pump water to the main pipe F, to which is attached the air dome G, and which also leads to the turbine or other motor H.

As the water from the various cylinders is pumped into the main pipe an even pressure will be maintained thereon through the medium of the air dome G, and this water passing through the turbine H will cause it to revolve and impart motion to the armature of the generator I, and from said generator suitable conductors may be led to the shore or other suitable point for supplying electricity for working purposes.

As there are a number of pumps located upon the central float and some or all of them will at all times be in operation, it follows that a constant stream of water will be forced through the motor, the flow of which may be regulated by suitable governors and relief valves, so that the minimum power will be utilized for generating the current while any surplus power will be thrown away, and as there is no cost of operation of such apparatus, this apparent waste of power is not objectionable.

One of the advantages of my present invention is that the floats will operate in comparatively shallow water while generating power on a large commercial scale, and where it is intended to operate a large plant from the current generated by this method, a number of such floats may be anchored at a suitable distance from the shore, and the combined current from all of these floats transmitted to a central station and either be used directly upon the line wire of a trolley or other system or stored in secondary batteries from which it may be drawn, as required.

Having thus fully described my invention, what I claim as new and useful, is—

1. In a wave motor of the character described, a central float, a series of secondary floats hinged thereto, pumps located upon the central float, the piston rods of which are connected with the secondary floats, a water motor also located upon the central float, pipes for leading water from the pump cylinders to the motor and an electric generator adapted to be operated by the water motor, as and for the purpose set forth.

2. In a water motor of the character described, a central float, a series of secondary floats hinged thereto, a series of pivoted cylinders located upon the central float, a series of blocks located upon the secondary floats to which the piston rods of the cylinders are attached, a main pipe connected with all of the cylinders to receive water pumped therefrom, an air dome connected with said pipe for equalizing pressure upon the water, a turbine also connected with said pipe by which it is supplied with water and an electric generator coupled to the turbine for converting the water power into electrical power, as specified.

In testimony whereof, I have hereunto affixed my signature in the presence of two subscribing witnesses.

JOHN A. McMANUS.

Witnesses:
JOSEPH C. SMITH,
S. M. GALLAGHER.